2 Sheets—Sheet 1.

F. M. LECHNER,

Assignor, by mesne assignments, to LECHNER MINING MACHINE COMPANY.

Mining Machine.

No. 9,507. Reissued Dec. 21, 1880.

Witnesses.
Henry Otto
W. A. Bliss

Inventor
Francis M. Lechner
by W. A. Doubleday
atty.

2 Sheets—Sheet 2.

F. M. LECHNER,

Assignor, by mesne assignments, to LECHNER MINING MACHINE COMPANY.

Mining Machine.

No. 9,507. Reissued Dec. 21, 1880.

Witnesses
Henry Orth
H. A. Bliss

Inventor
Francis M. Lechner
per H. A. Doubleday
atty

UNITED STATES PATENT OFFICE.

FRANCIS M. LECHNER, OF WAYNESBURG, ASSIGNOR, BY MESNE ASSIGNMENTS, TO LECHNER MINING MACHINE COMPANY, OF COLUMBUS, OHIO.

MINING-MACHINE.

SPECIFICATION forming part of Reissued Letters Patent No. 9,507, dated December 21, 1880.

Original No. 172,637, dated January 25, 1876. Application for reissue filed July 7, 1877.

*To all whom it may concern:*

Be it known that I, FRANCIS M. LECHNER, of Waynesburg, in the county of Stark and State of Ohio, have invented certain new and useful Improvements in Mining-Machines; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 3:
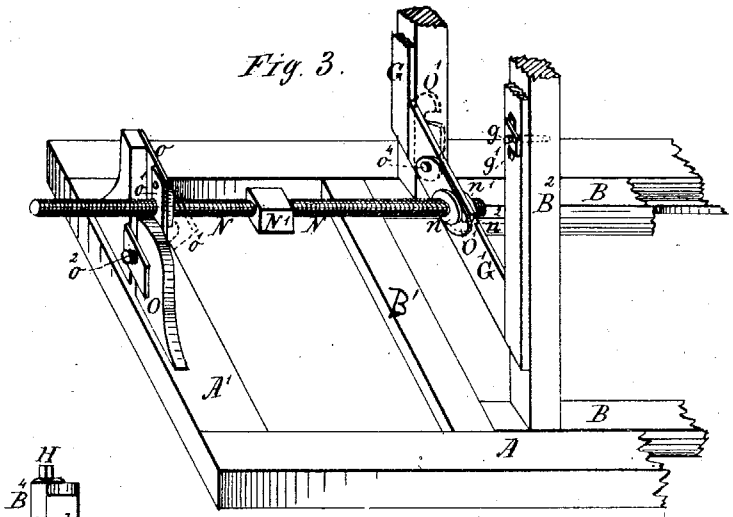
Figure 1:
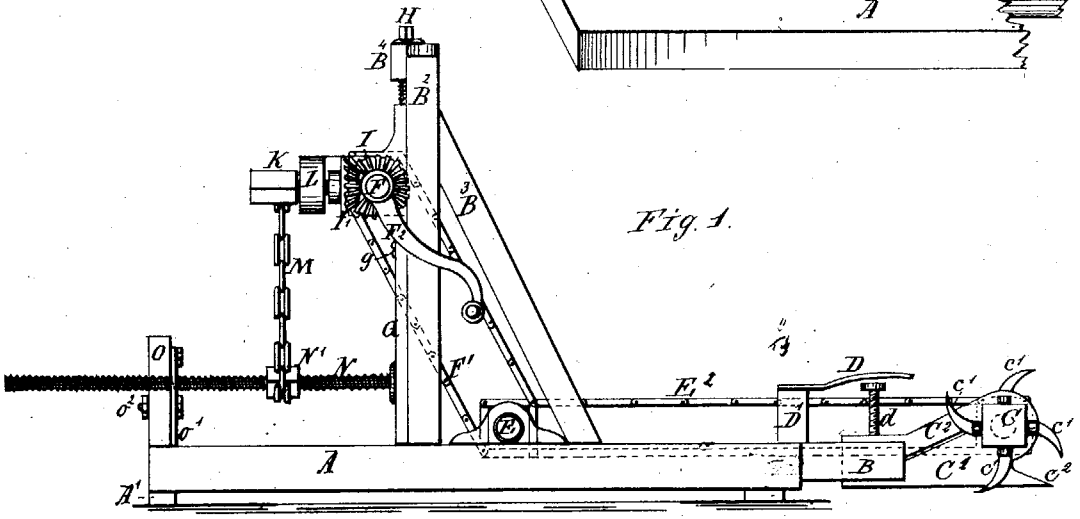
Figure 2:
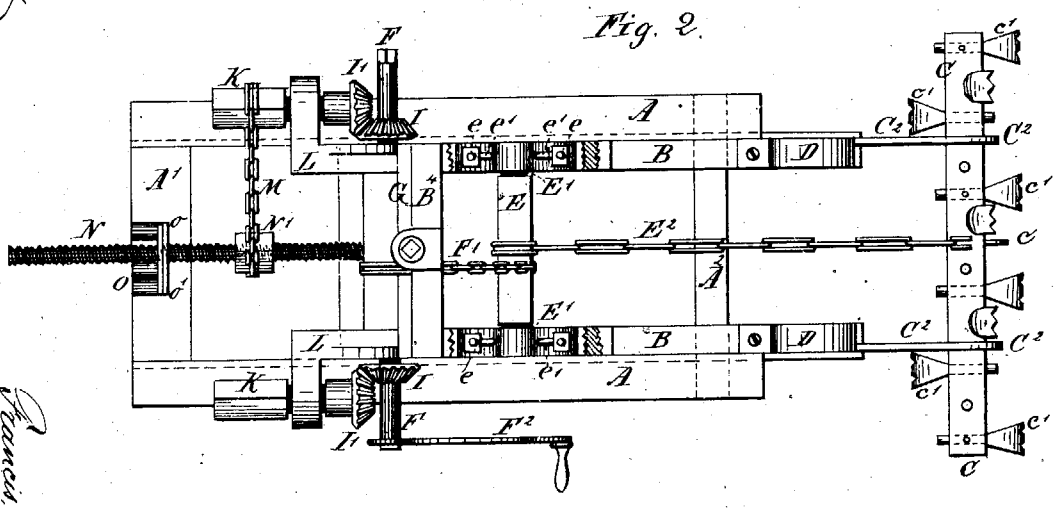

Figure 1 is a side elevation. Fig. 2 is a top or plan view, and Fig. 3 is a detached view of the feeding-screw and its supports.

The frame consists of two sills, A A, rear cross-girt, A′, and front cross-girt, $A^2$, below the sills, sliding carriers B B, girt B′, with posts $B^2$ $B^2$, braces $B^3$ $B^3$, and cap $B^4$, these parts being framed and bolted as may be found best. Carriers B B move in grooves or dovetails formed for their reception in sills A A, which, when the machine is being operated, are made fast to the floor of the mine by means of a jack-screw pressing firmly upon them, (or upon standard O,) and upon the roof of the mine.

C is a cutter-shaft, mounted at the front ends of the carriers B B in shoes C′ $C^2$. Of the shoes, C′ is the lower part, and $C^2$ is the upper part. Shaft C is preferably square, except where it is rounded to form bearings to turn in the metallic shoes C′ $C^2$.

*c c′* represent a number of cutting-teeth, the shanks of which are adjustably secured in cutter-shaft C by means of set-screws. The teeth *c′* are of such width upon their cutting-edges (see Fig. 2) that as they revolve they leave but narrow or thin walls of coal in front of the shoes C′ $C^2$, and at the points occupied by the driving-chain, and to break down or cut out these walls in front of the bearings of the shaft each shoe is armed at its lower side with a sharp projecting cutting-spur, *c²*. Each carrier has a guiding-plate, D, secured by one end to a block, D, the free end of each plate being adjusted vertically by means of a set-screw, *d*. These plates are adapted to press against the upper side of the kerf or drift which is being cut, and the shoe C′ rests on the bottom of the drift. Thus the cutting apparatus is always maintained in a proper working position, any tendency of the downward cutting motion of the teeth to elevate the cutting apparatus being counteracted by the contact of the guiding-plates D with the coal above.

E is a shaft revolving in suitable bearings, E′, on carriers B B. These bearings E′ are adjustably secured to the carriers B by bolts *e*, which pass through slots *e′* in said bearings. The central part of shaft E is squared and connected with cutter-shaft C by means of a driving-chain, E″, the links of which are of such length as to wrap and conform closely to the sides of shafts C E.

*c* is a cutting-tooth inserted in cutter-shaft C in such position that said tooth, which is narrow or thin, will pass between the two strips or plates of which the alternate links of the chain are composed. Thus this tooth *c* cuts a path for the chain.

F is a driving-shaft mounted in suitable bearings near the upper end of a frame, G, which slides up and down upon the rear of posts $B^2$ $B^2$. The central portion of shaft F is also squared and connected with shaft E by a chain, F′. In the drawings I have represented this frame as being connected with posts $B^2$ by bolts *g*, which pass through slots *g′* in the posts or side pieces; but any usual or approved method of clamping the frame to the posts which will permit it (the frame) to slide freely may be adopted.

$F^2$ is a crank on the end of shaft F. Through this crank, or through a pulley or gear-wheel, motion may be imparted to shaft F, and thence to the other parts of the machine.

H is a tightening-screw mounted in cap $B^4$, and engaging with a thread in the upper girt of frame G, to raise or lower said frame to adjust chain F′. Upon each end of shaft F, outside of its bearings, is a bevel-gear, I, meshing with a corresponding bevel-gear, I′, on one end of each of two shafts, K K, mounted in brackets L L, projecting from frame G.

M is a chain connecting shaft K with a feeding screw-shaft, N, having a square driving-block, N′, rigidly attached thereto at such distance from its inner end that the chain M shall always track properly. The rear end of shaft N is screw-threaded.

When preferred, shafts C, E, F, and N may be provided with sprocket-wheels to receive the chains, instead of being squared.

O is a standard rising from the rear cross-girt A′. This standard is slotted vertically, and has a hinged plate, *o o′*, bolted to it, the bolt $o^2$ passing through the slot. (See Figs. 1 and 3.)

Plate *o o′* is screw-threaded, to serve as a nut, with which the screw-shaft N engages. The front end of shaft N has two flanges or collars, *n n′*, secured thereto, and is seated in a bearing in the lower girt, G′, of the frame G. $n^2$ is a throat leading to this bearing.

O′ is a clamping and bearing plate, pivoted at $o^4$ to the girt G′, and serving the double purpose of confining shaft N in its seat in the girt and of protecting said girt from being rapidly worn away by collar *n*.

When it is desired to put the machine into operation it is placed upon the floor of the mine, with its cutter-bar parallel to the breast or wall into which it is desired to cut a kerf or drift, the sills A and carriers B B being arranged at about right angles to said breast, in which position it (the machine) is firmly secured, usually by means of jack screws. The driving-chains are to be properly adjusted and tightened, and the nut-plate *o o′* raised or lowered to correspond with the position of girt G′, should this be needed to prevent cramping of the screw feeding-shaft either in the nut or girt.

When the proper motion is imparted to the cutter-shaft C, through shaft F and its connections, the revolution of the feeding-shaft N in the nut will force the carriers B B and the cutting apparatus forward into the coal or other material, as will be readily understood without further explanation.

By driving the shaft F in the opposite direction the cutters may be withdrawn from the work.

One of the advantages which is due to the employment of chain for actuating the cutters is the rapidity with which the lower leg of the chain will bring out the cuttings of coal from the drift—an operation which is not performed in the same manner in those machines in which an endless chain traveling around an arm which is advanced upon a track or path parallel with the face of the breast of coal.

It will be seen that by the employment of a rotating horizontal cutter-shaft, arranged on a line parallel with the breast of coal, I am enabled to cut a thin drift or kerf just as wide as the cutter-shaft is long, and that I can push such drift directly into the coal to almost any desired distance.

It will be further seen that in my machine there is no side draft, and hence no lateral strain upon the frame-work. There is, however, a continuous upward thrust upon the front end of the carriers, owing to direction of rotation of the cutters being forward and downward against the opposing coal, and to support the carriers against this thrust I employ the guiding-plates D, and to guard against any undue depression of the carriers being produced by the cutters running under a stratum of slate, a "nigger-head," or other hard substance, I have applied supporting-shoes to the lower faces of said carriers.

Having thus explained the nature of my invention, what I claim is—

1. In a mining-machine, a rotating horizontal cutter-shaft mounted at right angles in front of its sliding supporting-frame, whereby said cutter-shaft is placed upon a line parallel with the breast of coal, and may be advanced into said breast of coal upon a path made by said cutter-shaft at a right angle thereto, substantially as set forth.

2. In a mining-machine, a rotating horizontal cutter-shaft arranged at a right angle to its supporting-frame, in combination with a driving-chain arranged on a line parallel with the sliding carriers, substantially as set forth.

3. In a mining-machine, a rotating horizontal cutter-shaft mounted at the front end of a carrier-frame which is advanced into the coal with the cutter-shaft, in combination with shoes attached to the sliding carrier-frame, to support the cutters and frame against downward thrust, substantially as set forth.

4. In a mining-machine, the combination, with a rotating horizontal cutter-shaft and its sliding carriers, of guides attached to the carriers to support them against the upward thrust produced by the cutters, substantially as set forth.

5. In a mining-machine, the combination, with a rotating horizontal cutter-shaft and its carriers, of cutting-spurs attached to the carriers to cut out the coal in front of the shaft-bearings, substantially as set forth.

6. The combination, in a mining-machine, of the posts B′ B′, sliding frame G, shafts E F, and chain F′, substantially as set forth.

7. The combination, with the bed-frame and the sliding carriers, of the feeding screw-shaft N, block N′, and driving-chain M, operated from the main driving-shaft, substantially as set forth.

8. The combination of the cutter-shaft C, shafts E F, and chains F′ E², substantially as set forth.

9. The combination, in a mining-machine, of the adjustable frame G and the feeding-screw N, having one end adjustable upon the bed-frame, substantially as set forth.

10. The combination, with the cutter-shaft C and driving-chain E², of the narrow cutting-tooth $c'$, constructed to strike through the links of the chain, substantially as set forth.

11. The combination, with the feeding-screw N, of the bearing having a throat, $n^2$, and a clamping-plate, O′, substantially as set forth.

In testimony that I claim the foregoing I have hereunto set my hand this 21st day of June, 1877.

FRANCIS M. LECHNER.

Witnesses:

H. W. NEEREAMER,

JAS. G. BULL.